W. G. BERGMAN.
GAS AND AIR REVERSING VALVE.
APPLICATION FILED AUG. 2, 1920.
1,428,525.
Patented Sept. 12, 1922.
2 SHEETS—SHEET 1.
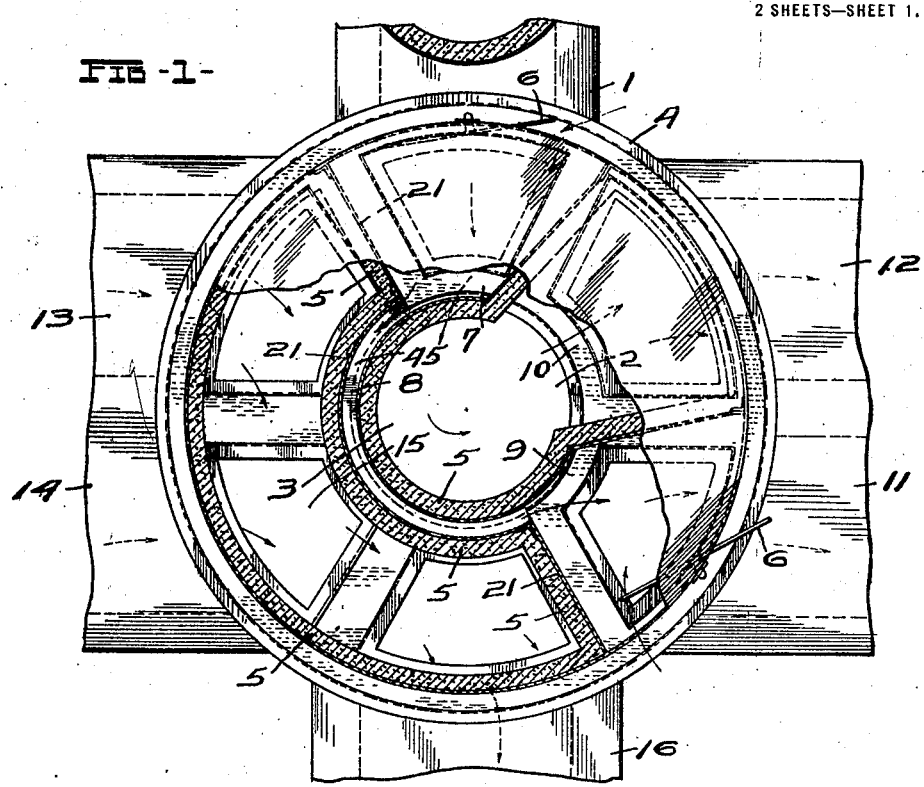
FIG-1-
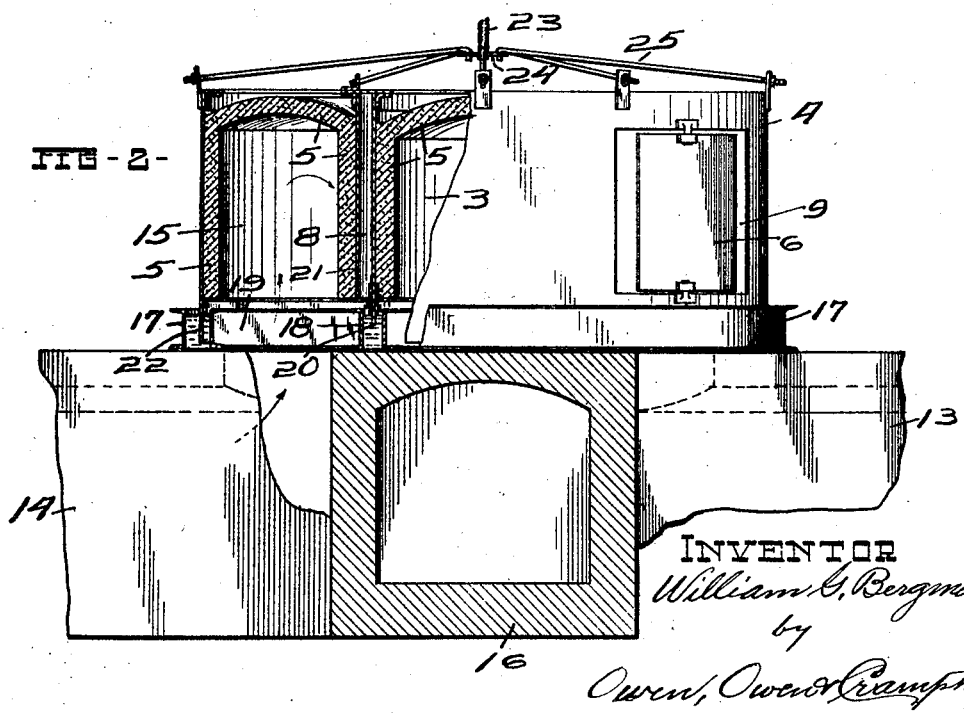
FIG-2-
INVENTOR
William G. Bergman,
by
Owen, Owen & Crampton.

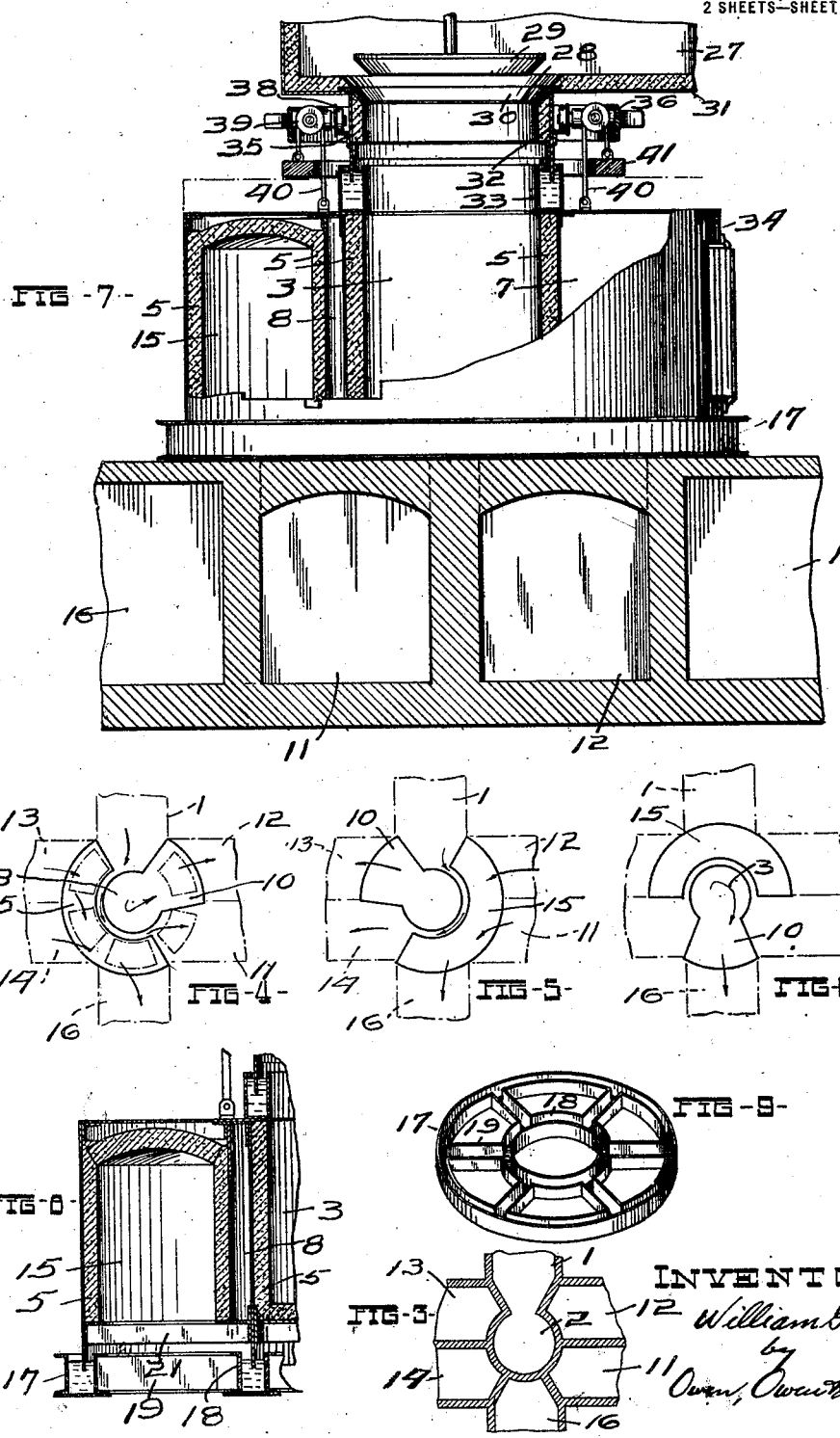

Patented Sept. 12, 1922.

1,428,525

UNITED STATES PATENT OFFICE.

WILLIAM G. BERGMAN, OF TOLEDO, OHIO.

GAS AND AIR REVERSING VALVE.

Application filed August 2, 1920. Serial No. 400,886.

*To all whom it may concern:*

Be it known that I, WILLIAM G. BERGMAN, a citizen of the United States, and a resident of Toledo, in the county of Lucas and State of Ohio, have made an Invention Appertaining to Gas and Air Reversing Valves; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to produce a simple and yet efficient gas and air reversing valve and one which will occupy a comparatively small floor area and which may be so manipulated that it may be used not only to reverse the direction of gas and air to and from sources of supply of the gas and air and the consuming instrumentality thereof, but also may be so adjusted or positioned that it will permit the flow of gas directly from the source of supply to a delivering means such as a stack, particularly, for burning out any deposits such as soot that may accumulate in the main or may accumulate in any device through which the gas may pass to and from the valve. It also has for its object to provide a reversing valve which may be manipulated with the least loss of gas and moreover is so constructed that in the operation of the valve the movement of the air will be controlled as well as the movement of the gas and so that upon a single operation of the reversing valve, air and gas cannot commingle before they are discharged in the consuming device, such as a furnace, whereby explosions that sometimes occur in connection with reversing valves now known in the art, are entirely prevented.

The invention also has for its object to provide a means for keeping the air and gas reversing valve cool to prevent burning and warping of the valve.

The invention may be contained in constructions of different forms. To illustrate practical applications of the invention I have selected one or two constructions as examples of constructions containing the invention and shall describe them hereinafter. The constructions selected for purposes of illustration are shown in the accompanying drawings.

Figure 1 of the drawings illustrates a top and sectional view of one of the constructions selected. Fig. 2 illustrates a side and sectional view of the air and gas reversing valve illustrated in Fig. 1. Fig. 3 is a sectional view showing the subterranean passageways used in connection with the valve illustrated in Figs. 1 and 2, the showing in Fig. 3 being very much reduced. Figs. 4, 5 and 6 illustrate diagrammatically the valve in three different positions. Fig. 7 illustrates a side view and section of a modified construction containing my invention. Fig. 8 illustrates a section of a part of the valve illustrated in Fig. 7, showing the manner in which the valve is sealed. Fig. 9 illustrates a radial trough for containing a sealing means and used in connection with the valve shown in Figs. 1 and 7.

1, Fig. 1, is the subterranean passageway for the gas that is used or consumed in any device, such as, a furnace of any form. The passageway 1 may be connected with a source of gas supply of any form, such as, a source of producer gas. As illustrated in Fig. 3 it terminates in an upwardly extending passageway 2 which terminates in a central preferably circular chamber 3 formed in the valve 4.

The valve 4 is preferably formed of sheet material such as sheet iron having a plurality of chambers which communicate with each other or with subterranean passageways leading to and from the sources of gas and air supply and the consuming devices, such as a furnace and a delivering means for the waste gases, such as the stack. The valve is so constructed that these passageways will be connected according to the position of the valve with reference to the passageways leading to and from the source of supply and the consuming device and the delivering means. My invention thus provides a simple means for interconnecting the different instrumentalities and reversing the directions of flow of the air and gas as may be desired.

The chambers of the gas valve 4 are insulated from each other by any suitable means such as by the fire brick walls 5 or other refractory material. Also in constructions containing my invention I may provide air passageways so located that the air will move between the walls of the chamber that are subject to intense heat whereby the walls of the valve will be kept cool by the moving air. Also by my invention I provide means whereby the heat that will thus be absorbed by the air will be utilized in the operation of certain of the instrumentalities that are controlled by the valve. As shown in the drawings, air may be admitted through dampers or doors 6 into certain of the chambers of the air valve and be drawn between the central and outer chamber of the air valve and directed to the consuming device. The air will thus move around the chamber through which the hot producer gas on one side passes and the hotter waste gases located on the other side and inasmuch as the air passing between the walls of these chambers is directed into the consuming device, such as, a furnace, the heat is utilized in the operation of the furnace. In the form of construction illustrated in the figures, the air passes through one door 6 when the valve is in one position and into the chamber 7 and through the annular passageway 8 and into chamber 9 and then down through the bottom of the valve into the subterranean passageway through which the air moves to the furnace. The chamber 9 is also provided with a door 6 through which air may be drawn when open and directed directly down into the subterranean air passageway. The major portion of the air that passes through the subterranean portion of the air passageway passes through the door 6 of the chamber 7 whereby the major portion of the air is heated by passing in vicinity to the hot producer gas and the hotter waste gases of the furnace, while the door 6 of the chamber 9 is open only to such extent as may be required to supply additional air to the furnace and thus the door 6 of the chamber 9, when the valve is in the particular position shown in Fig. 1, is for the purpose of obtaining a more refined adjustment of the air supply to the furnace. When, however, the valve is reversed and the chamber 9 takes the position that the chamber 7 occupies in the figure shown, the doors 6 operate in a reverse manner to keep the valve cool and to adjust the air supply to the furnace.

The valve 4 is also provided with a chamber 10 which is located intermediate the chambers 7 and 9 through which the gas from the producer main or subterranean passageway 1 enters a second subterranean passageway 12 that communicates with the furnace. The chamber 10 communicates with the chamber 3 which in turn communicates with the subterranean gas passageway 1 so that the gas flows from the subterranean passageway 1 into the subterranean passageway 12 while air passes in the manner described through the subterranean passageway 11. The passageways 11 and 12 may terminate in a checker work for preheating the gas and air particularly where the gas is to be used for heating glass and steel furnaces, or the like, in the manner well known in the art. As also is well known, the checker work is heated by the waste gases that pass from the furnace and thus the gas and air will be preheated before entering the furnace. The gas and air is allowed to flow a short time through the passageways 11 and 12 whereupon the direction of flow of the gas and air on the one hand and the waste gases on the other hand are reversed so that the gas and air moves for a short time through the checker work heated by the waste gases during the preceding period, and upon reversal of the flow the gas and air is heated in the checker work which received the waste gases during the preceding period.

When the valve is in the position illustrated in Fig. 1, the air and gas passing through the passageways 11 and 12 are heated by the checker work to which the passageways 11 and 12 are connected and the waste gases pass through checker work on the other side of the furnace and into the valve through the passageways 13 and 14. It rises and enters the chamber 15. The chamber 15 covers openings in the upper sides and at the ends of the passageways 13 and 14. The waste gases pass through the chamber 15 and enter the subterranean passageway 16 that connects with the stack which operates to draw the air into the chambers 7 and 9 and also cooperates to produce the movement of the gas through the chambers 3 and 10 as well as to draw the waste gases from the furnace and checker work through the subterranean passageways 13 and 14.

During this operation the interior of the valve is kept cool and the destructive effect of the exceedingly hot waste gases that pass through the chambers 15 is entirely obviated by the movement of the cooling air through the annular passageway or chamber 8 located in the central part of the valve. Also during this operation the two sets of checker work that are connected with the passageways 13 and 14 are heated by the hot waste gases and when the temperature thereof has been sufficiently raised, the air and gas reversing valve is operated to direct the gas from the subterranean passageway 1 through the subterranean passageway 13 and the air through the subterranean passageway 14 to the furnace, which will direct the gas and air to the checker work which has been heated when the valve was in the position illustrated in Fig. 1, whereby the gas and air passing through the subterranean passageways 13 and 14 will be preheated by the checker work before their delivery to the furnace.

As shown diagrammatically in Figs. 4 and 5 the reversing valve is moved 120° to redirect the gas and air to the checker work which has been heated during the preceding period by the waste gases. A major portion of the air now enters through the door 6 of the chamber 9 and passes through the annular passageway or chamber 8 into the chamber 7 and then down into the subterranean passageway 14, the door 6 of the chamber 7 may be closed slightly in order to regulate the amount of air that is directed to the checker work of the furnace. The gas passing from the subterranean passageway 1 and from the source of supply of the producer goes up through the circular chamber 3 and into the chamber 10. From the chamber 10 it passes down into the subterranean passageway 13 and thence to the checker work and the furnace. The waste gases on the other hand will pass up through the chamber 15 which now covers the ends of the passageways 11 and 12 as well as the end of the passageway 16, and so that the waste gases pass up from the passageways 11 and 12 into the chamber 15 and then down into the subterranean passageway 16 on their way to the stack.

When the air and gas and waste gases have passed through the passageways and chamber, as described, for a period sufficient to raise the temperature of the checker work connected to the right side of the valve, that is, connected to the passageways 11 and 12, the valve is again operated so as to make the connections as shown in Fig. 4 and as heretofore described. The air and gas valve is thus reversed at the end of each period during which the temperature of the checker work is raised to the required degree.

In order that the chambers may be sealed from each other and from the exterior atmosphere, I have provided a circular trough 17 and a similar concentric circular trough 18 and radiating troughs 19 which communicate with the concentric troughs. The lower edge of the valve 4 extends into the outer circular trough 17. Preferably, the sheet iron of which the outer wall of the valve is formed extends into the trough 17. The chamber 3 is also provided with a downwardly extending flange 20 preferably of sheet iron which extends into the inner circular trough 18. The sheet iron flange 20 conforms to the configuration of the lower edge of the two chambers 3 and 10 and thus the chambers 3 and 10 are sealed from the other chambers of the valve and from the exterior atmosphere. The chamber 8 is located above the bottom wall 45 of the valve 4 and thus the flange 20 also conforms to that portion of the chamber 15 located in proximity to the chamber 3 and thus the chambers 3 and 15 are separated by the flange 20 which extends into the trough 18. The chamber 15 is separated from the chambers 7 and 9 by the radially extending flanges 21. The radially extending flanges 21 and the radial portions of the flange 20 have a width less than the circular flange 22 and the circular portion of the flange 20 so that when the valve 4 is lifted a short distance the radial flanges 21 and the radial portions of the flange 20 will be first withdrawn from the troughs 19. When the valve 4 is raised a short distance and sufficient for the radially extending flanges to clear the troughs 19 the valve 4 may be rotated 120° by any suitable means, and so as to bring the radially extending flanges over the radial troughs 19 which are located 60° apart. This prevents the escape of the producer gas and the waste gases into the air. The valve 4 is thus raised but a very short distance each time it is reversed and the gases are kept within the valve and not permitted to escape to the atmosphere. Any form of sealing material may be placed in the troughs.

Any form of means may be used for raising and rotating the valve 120°. I have shown conventionally, a means for raising the valve which consists of the cable 23 which is connected to a disc 24. The disc 24 is connected to the valve 4 by means of the rods 25. When the valve is raised by means of the cable 23 a short distance, it may be rotated 120° by hand or automatically by any suitable means.

The valve may be used not only for reversing the direction of the air and the waste gas through the checker work and the furnace, but also it may be used for burning out the passageway for the producer gas or directly connecting the passageways that lead to and from the valve. The position of the valve in the burning out operation is illustrated diagrammatically in Fig. 6. The valve 4 may be located so as to place the chamber 10 directly over the end of the subterranean passageway 16 which will directly connect the subterranean passageway 1 with the subterranean passageway 16 and thus directly connect the source of gas supply with the stack. The gas main 1 may thus be burned out by the opening of suitable doors to admit air which mixing with the gas will ignite and the soot and other material deposited from the gas in the gas main may be burned out in the manner well known in the art.

In Fig. 7 I have illustrated a modification of a construction which is usable where the gas is preferably directed from above into the top of the gas valve. The gas enters the chamber 27 and passes through an opening 28 closed by a valve member 29 that seats upon the seat 30 when closed. The chamber 27 may be surrounded by a wall 31 of suitable heat insulating or protective material such as fire brick. A cylindrical drum 32 is located around the opening 28 and is also protected by a suitable wall of refractory material. The drum 32 extends into a sealing trough 33 in which its lower edge extends. The trough 33 is located on the top of the valve 34 and its depth is sufficient to permit sealing of the edge of the drum 32 when the valve is in a raised or in its lowered position. The gas passes through the drum 32 from the chamber 27 and enters the chamber 3 of the valve instead of rising from the end of the passageway 1 as in the form of the construction illustrated in Fig. 1. The gas then passes through the chamber 10 and into either the passageway 12 or the passageway 13 according to the position of the valve.

The valve 34 may be raised and rotated by any suitable means. In Fig. 7 I have shown, for purpose of illustration, a means that may be adopted for raising and lowering the valve 34. The drum 32 is provided with a track 35. A collar 36 is provided with inwardly extending bosses 37 in which may be mounted shafts for the support of flanged wheels 38 that are so positioned as to be located on the track 35. The collar 36 may thus be rotated about the drum 32, the wheels 38 rotating on the track 35. To the bosses may be secured pulleys 39 on which the cables 40 may be located. Each cable 40 is connected to the valve 34 at one end and to an annular counter-weight 41 at the other end. This provides a means for balancing the valve 34 whereby it may be easily raised by hand and also it provides a means whereby the valve 34 may be rotated the required number of degrees by hand in order to place the valve in its different positions to produce reversal of the gases or to connect the main of the producer gas directly with the stack.

I claim:

1. In an air and gas reversing valve having gas and waste gas chambers, means for directing air through the valve to cool the walls of the chambers.

2. In an air and gas reversing valve having gas and waste gas chambers, means for directing air through the valve to cool the walls of the chambers, and means for reversing the flow of the air through the valve.

3. In an air and gas reversing valve, a valve member having a gas chamber and a waste gas chamber, and an air passageway located between the gas and waste gas chambers for directing air between the chambers.

4. In an air and gas reversing valve, a valve member having an air chamber and a gas chamber, and means for directing air around the gas chamber to the air chamber for cooling the wall of the gas chamber.

5. In an air and gas reversing valve, a valve member having an air chamber, a gas chamber and a waste gas chamber, means for directing air between the gas chamber and the waste gas chamber to the air chamber.

6. In an air and gas reversing valve, a valve member having partitioning walls forming an air chamber, a gas chamber and waste gas chamber, the air chamber being defined by walls that form also walls of the gas and waste gas chambers.

7. In an air and gas reversing valve, a valve member having an air chamber, a gas chamber and a waste gas chamber, the air chamber partly surrounding the gas chamber and being located between the gas chamber and the waste gas chamber.

8. In an air and gas reversing valve, a valve member having partitioning walls forming a gas chamber and an air chamber separated by a common wall, the air chamber partly surrounding the gas chamber, and air and gas passages for directing the air heated by contact with the wall of the gas chamber and the gas from the valve.

9. In an air and gas reversing valve, a valve member having partitioning walls forming a gas chamber, a waste gas chamber and an air chamber defined by walls that form also walls of the gas chamber and the waste gas chamber, and air and gas passageways for directing the air and gas from the valve.

10. In an air and gas reversing valve, a valve member having a gas chamber and an air chamber surrounding the gas chamber and a waste gas chamber partly surrounding the air chamber, and means for directing the air and gas from the valve.

11. In an air and gas reversing valve, a valve member having a central gas chamber and air and waste gas chambers partly surrounding the central chamber.

12. In an air and gas reversing valve, a valve member having a central gas chamber and air and waste gas chambers partly surrounding the central chamber, the air chamber being located between the central gas chamber and the waste gas chamber.

13. In an air and gas reversing valve, a valve member having a central gas chamber, an air chamber and a waste gas chamber each partly surrounding the central chamber, an inlet gas passageway for directing gas to the central chamber, the inlet port of the gas passageway being located in alignment with the vertical axis of the central chamber.

14. In an air and gas reversing valve, a valve member having partitioning walls forming a pair of air chambers and a gas chamber, the air chambers being separated by the gas chamber and two of the walls of the gas chamber being also walls of the air chambers and a pair of exit gas passageways separated by the width of an air chamber.

15. In an air and gas reversing valve, a valve member having partitioning walls forming a pair of air chambers and a pair of gas chambers, the walls of the air chambers also forming the walls of the gas chambers, the valve member having a pair of gas outlets separated from each other by substantially the width of one of the air chambers.

16. In an air and gas reversing valve, a substantially cylindrical valve chamber, a central substantially cylindrical gas chamber, a pair of concentric sealing troughs for sealing the edges of the valve and of the central chamber.

17. In an air and gas reversing valve, a substantially cylindrical valve member having a substantially cylindrical central gas chamber, air and waste gas chambers partly surrounding the central chamber and separated by radiating walls, a pair of concentric sealing troughs for sealing the edges of the valve member and of the central cylindrical chamber, radiating troughs connecting the concentric troughs for sealing the lower edges of the radiating walls of the sector shaped chambers.

18. In an air and gas reversing valve, a substantially cylindrical valve member having a substantially cylindrical central gas chamber, air and waste gas chambers partly surrounding the central chamber and separated by radiating walls, a pair of concentric sealing troughs for sealing the edges of the valve member and of the central cylindrical chamber, radiating troughs connecting the concentric troughs for sealing the lower edges of the radiating walls of the sector shaped chambers, the edges of the valve and the central chamber extending below the edges of the radiating walls of the sector shaped chamber.

19. In an air and gas reversing valve, a gas inlet passageway and a gas outlet passageway, a pair of passageways located on each side of the first two named passageways, the valve having a gas chamber for connecting the gas inlet passageway with the gas outlet passageway and having means for closing the said pairs of passageways.

20. In an air and gas reversing valve, a valve member having partitioning walls forming a pair of air chambers, a gas chamber and a waste gas chamber, the gas chamber formed by walls of the air chambers, the gas chamber having a width substantially the same as each of the air chambers, the waste gas chamber having a width substantially the same as the total of the air and gas chambers, two of the walls of the waste gas chamber being also walls of the air chambers, a gas inlet passageway and a waste gas outlet passageway, four additional passageways, the waste gas chamber connecting two of the said four passageways with the waste gas outlet passageway, and the air chambers for connecting one of the four passageways with atmospheric air and the gas chamber for connecting the gas inlet passageway with the remaining of the four passageways.

21. In a circular rotatable air and gas reversing valve, a valve member having a central gas chamber, a portion thereof extending substantially radially, an air chamber extending around and having portions thereof located on opposite sides of the gas chamber, a waste gas chamber and four passageways arranged in pairs, a gas inlet passageway and a gas outlet passageway, the waste gas chamber being adapted to connect either pair of the four passageways with the gas outlet passageway and the gas chamber for connecting the gas inlet passageway with one of the remaining pair of the said four passageways and an air chamber for connecting the atmospheric air with the remaining of the four passageways.

22. In an air and gas reversing valve, a gas inlet passageway and a gas outlet passageway, a pair of passageways located on each side of the first two named passageways, the valve chamber having a gas chamber for connecting the gas inlet passageway with one of the four last named passageways, and a pair of connected air chambers, the walls of one of the chambers having means for connecting the last named air chamber directly with the atmosphere, the other of the air chambers for connecting another of the four last named passageways with the first named air chamber, and a waste gas chamber for connecting the remaining two of the four passageways with the gas outlet passageway, the connection between the air chambers being located between the gas chamber and the waste gas chamber.

23. In an air and gas reversing valve, a valve member having partitioning walls forming a pair of air chambers and a gas chamber, two of the walls of the gas chamber being common with two of the walls of the air chambers.

In testimony whereof I have hereunto signed my name to this specification.

WILLIAM G. BERGMAN.